E. PALLADINI.
LOCK.
APPLICATION FILED MAY 19, 1914.

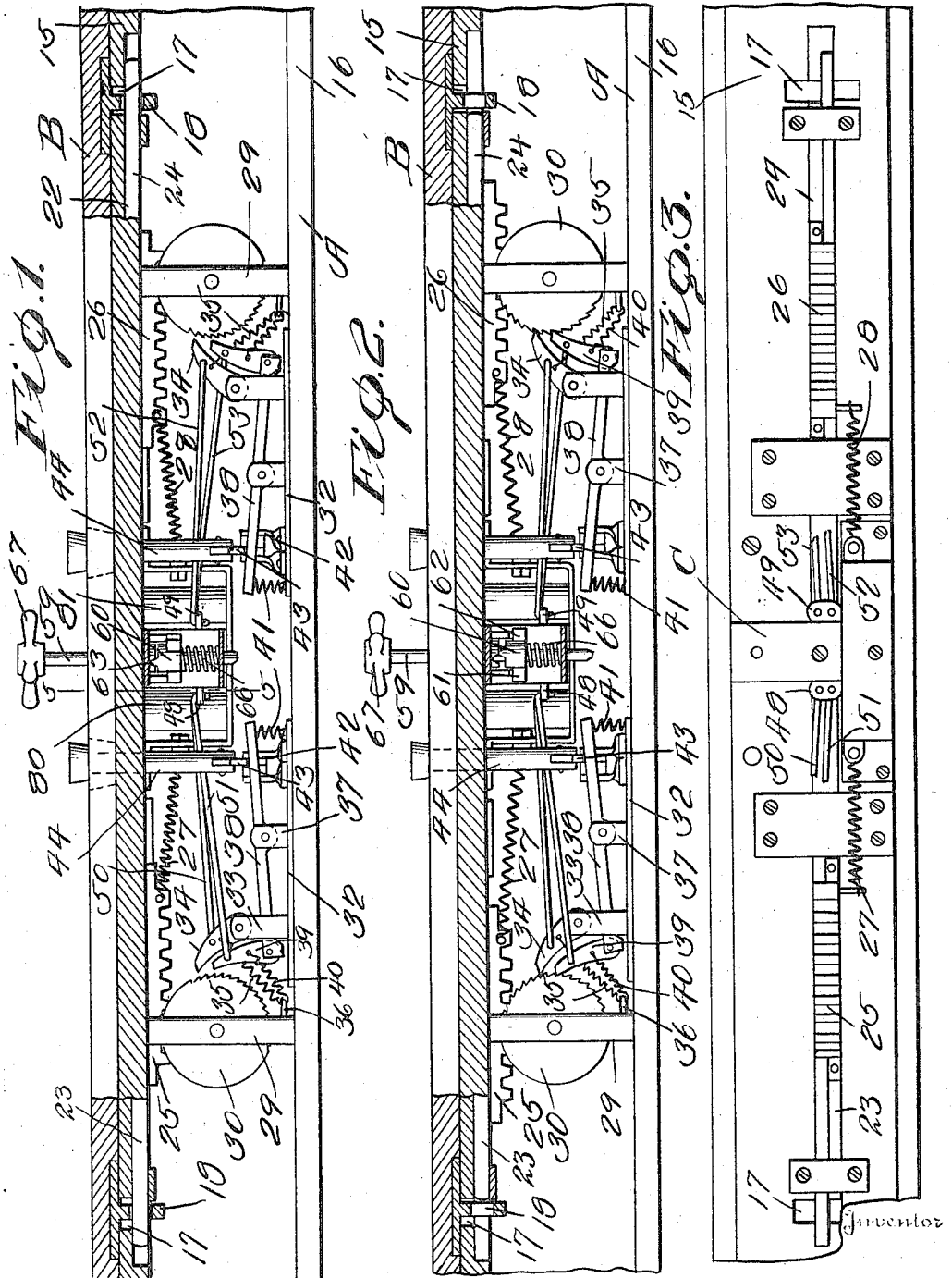

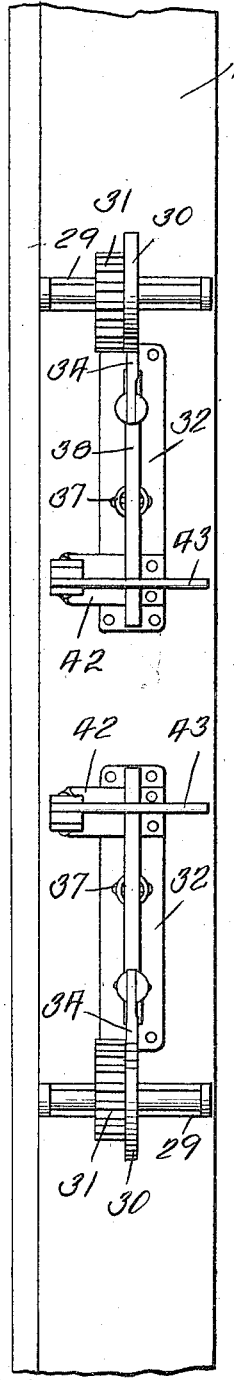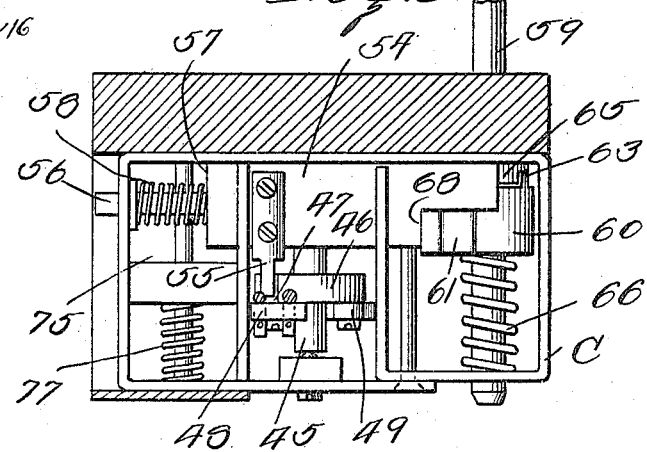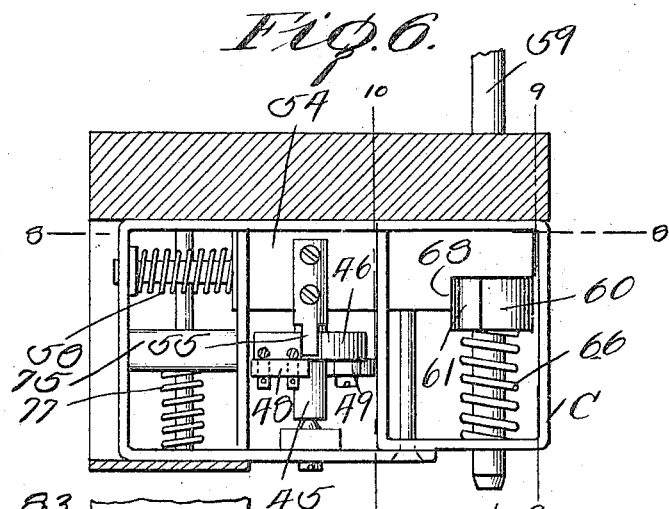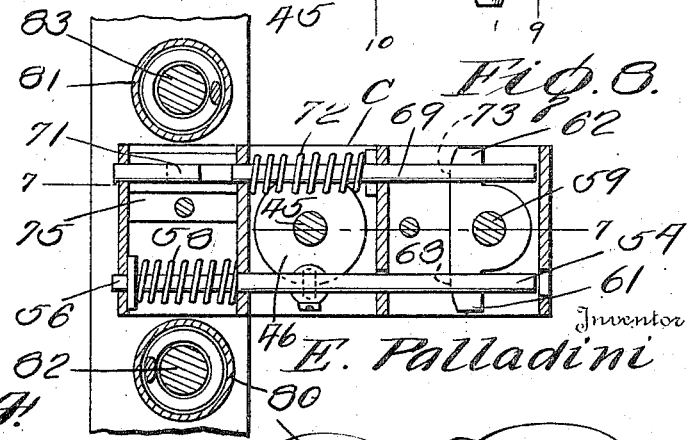

1,238,048.

Patented Aug. 21, 1917.
4 SHEETS—SHEET 3.

Inventor
E. Palladini
By Chandler Chandler
Attorney

Witnesses
B. S. Swann
Henry T. Bright

UNITED STATES PATENT OFFICE.

ERNEST PALLADINI, OF ALBUQUERQUE, NEW MEXICO.

LOCK.

1,238,048.   Specification of Letters Patent.   Patented Aug. 21, 1917.

Application filed May 19, 1914. Serial No. 839,596.

*To all whom it may concern:*

Be it known that I, ERNEST PALLADINI, a citizen of the United States, residing at Albuquerque, in the county of Bernalillo, State of New Mexico, have invented certain new and useful Improvements in Locks; and I do hereby declare the following to be a full, clear, and exact description of the invention, such as will enable others skilled in the art to which it appertains to make and use the same.

This invention relates to locks and particularly to permutation locks.

The object of the invention resides in the provision of a lock of the character named which embodies a novel construction designed to render it impossible to open the lock unless the combination and method of operating same is known, the lock being further designed and constructed to permit of the combination being changed when desired.

A further object of the invention resides in the provision of a lock of the character named constructed and arranged to have a wide field of application, and capable of being operated in the dark without the use of a key.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 14:
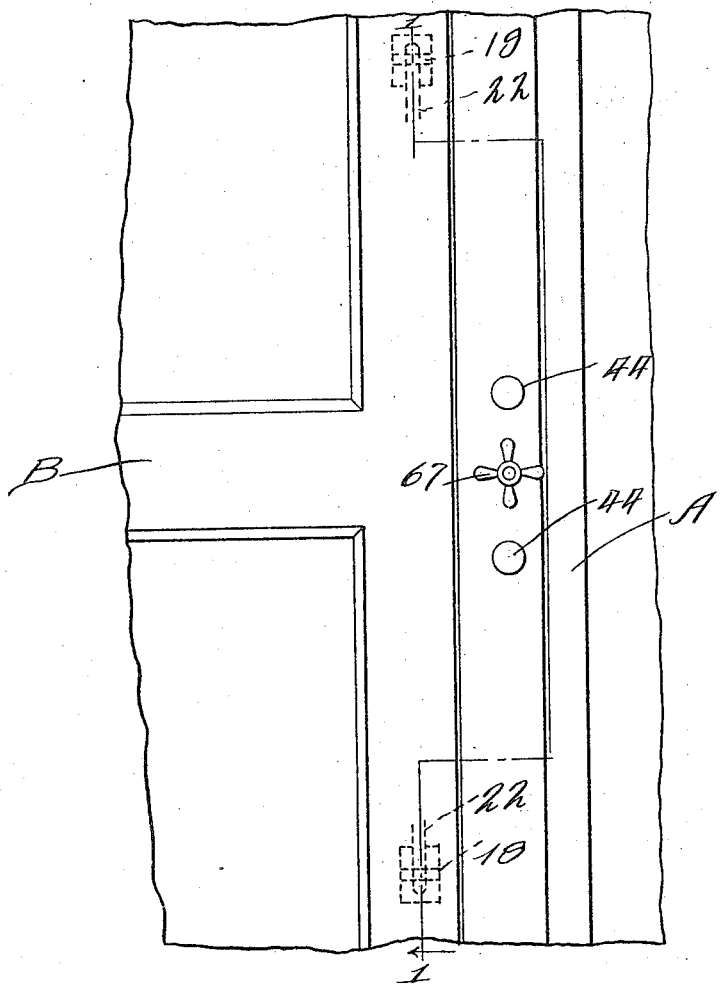

Figure 1 is a section on the line 1—1 of Fig. 14 showing the improved lock with the parts thereof in the position they would occupy when the door is locked.

Figure 7:
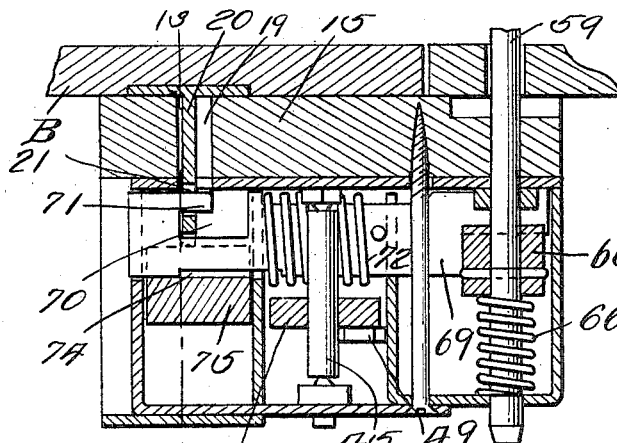
Figure 9:
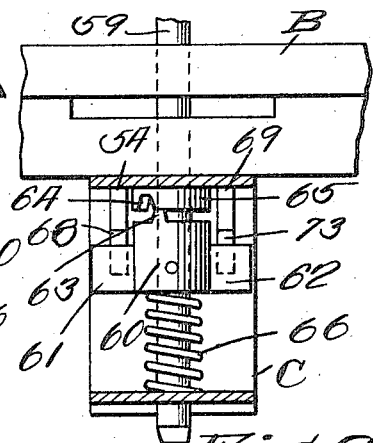
Figure 10:
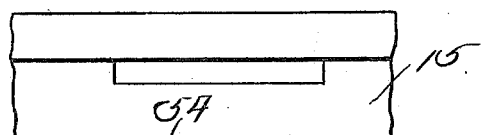
Figure 12:
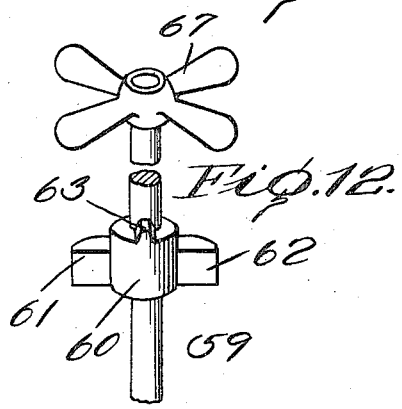
Figure 11:
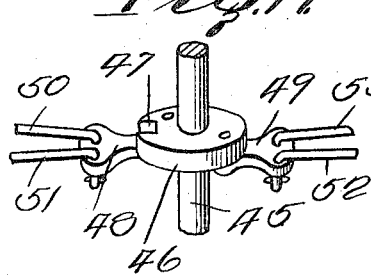
Figure 13:
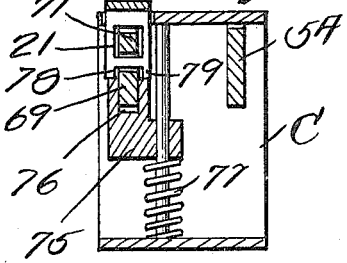

Fig. 2, a view similar to Fig. 1 showing the main locking bolts retracted;

Fig. 3, a view looking at the inner side of the front member of the door frame and showing the parts carried by said member;

Fig. 4, a view looking at the inner side of the rear member of the door frame, and showing the parts carried by said member;

Fig. 5, a section on the line 5—5 of Fig. 1;

Fig. 6, a view similar to Fig. 5 with the parts in the position they would occupy when they have been set to permit the unlocking operation to be instituted;

Fig. 7, a section on the line 7—7 of Fig. 8;

Fig. 8, a section on the line 8—8 of Fig. 6;

Fig. 9, a section on the line 9—9 of Fig. 6;

Fig. 10, a section on the line 10—10 of Fig. 6;

Fig. 11, a perspective view of the rotating disk through the medium of which the operating pawls are moved into and out of operative position with respect to their co-operating ratchet wheels;

Fig. 12, a perspective view of a fragment of the operating shaft and its handle, and Fig. 13, a section on the line 13—13 of Fig. 7.

Fig. 14 is a front elevation of a door and the frame therefor showing the invention applied thereto.

Referring to the drawings A indicates a door frame of the usual hollow construction and B a door hingedly mounted in said frame. The frame A includes an outer member 15, and an inner member 16 disposed opposite each other as is usual in the construction of door frames. The outer member 15 is provided with spaced openings 17 through which are adapted to project respectively apertured keepers 18 carried by the door B when said door is disposed in closed position. The outer member 15 is further provided with an opening 19 through which is adapted to project a keeper 20 carried by the door B when said door is in closed position, it being noted that the keeper 20 is provided with an opening 21 for a purpose that will presently appear. Secured to the inner side of the member 15 is a frame C in which is mounted certain mechanisms to be hereinafter referred to. The member 15 is provided on its inner side with a longitudinal groove 22 which intersects the openings 17. Slidably retained in the groove 22 are locking bolts 23 and 24. Secured to the bolts 23 and 24 respectively are rack bars 25 and 26. Connected to the rack bar 25 is one end of a spring 27, while the other end of said spring is connected to the frame C. This spring 27 constantly tends to hold the bolt 23 projected across one of the openings 17 and through one of the keepers 18 when said keeper is disposed in the opening 17. Another spring 28 has one end secured to the rack bar 26 and its other end to the frame C and constantly tends to hold the bolt 24 projected across the other opening 17 and through the other keeper 18 when said keeper is disposed in the opening 17. Mounted upon the member 16 in proximity to the rack bar 25 is a U-shaped bracket 29 between the arms of which is rotatably mounted a ratchet wheel 30. Secured to one side of the ratchet wheel 30 is a segmental gear 31 which meshes with the rack 25 so that rotation of the ratchet wheel 30 in one direction will move the locking bolt 23 out of locking relation to its coöperating keeper 18. Secured to the member 16 between the bracket 29 and the frame C is a plate 32. Rising from the plate 32 adjacent the ratchet wheel 30 is a forked bracket 33 between the arms of which is pivoted a locking pawl 34 which coöperates with the teeth of the ratchet wheel 30, said pawl being normally held in engagement with the ratchet wheel 30 by means of a spring 35 one end of which is secured to said pawl and the other end to a plate 36 carried by the bracket 29. Rising from the plate 32 at substantially the center of said plate is a bracket 37 to which is pivoted a lever 38. One end of this lever 38 extends between the arms of the bracket 33 and has pivoted thereon an operating pawl 39 normally held in engagement with the ratchet wheel 30 by means of a spring 40 one end of which is secured to the pawl 39 and its other end to the plate 36. The end of the lever 38 remote from the ratchet wheel 30 is normally held elevated by means of a spring 41 interposed between same and the plate 32. Mounted upon the plate 32 between the bracket 37 and spring 41 is a bracket 42 upon which is pivoted a lever 43 for movement in a plane transverse the lever 38 and engaging the side of the lever 38 remote from the plate 32. Slidably mounted in the member 15 is a plunger 44 the end of which that is disposed within the frame A being pivotally connected to the free end of the lever 43. By this construction it will be obvious that when the locking bolt 23 is projected through its coöperating keeper 18 intermittent depression of the plunger 44 will rotate the ratchet wheel 30 so as to withdraw the locking bolt 23 from its coöperating keeper 18. The number of depressions of the plunger 44 necessary to effect the retraction of the bolt 23 is dependent upon the position of the rack bar 25 with respect to the ratchet wheel 30 when the rotation of the ratchet wheel 30 is instituted by the depression of the plunger 44. The rack bar 26 and bolt 24 are operated by a mechanism similar in every respect to the mechanism which operates the rack bar 25 and bolt 23 and for this reason detail reference to the operating mechanism of the rack bar 26 and bolt 24 will be omitted, it being noted that the reference characters employed in describing the mechanism for operating the rack bar 25 and the bolt 23 will be applied to similar parts of the mechanism for operating the rack bar 26 and bolt 24.

Rotatably mounted in the frame C is a shaft 45 upon which is fixed a disk 46 having a recess 47 in the periphery thereof. Pivotally connected to the disk 46 at diametrically opposite points are arms 48 and 49. The arm 48 is connected to the pawl 34 and the pawl 39 of the mechanism which operates the bolt 23 by means of links 50 and 51 respectively, while the arm 49 is connected to the pawl 34 and the pawl 39 of the mechanism which operates the bolt 24 by means of links 52 and 53 respectively. Slidably mounted in the frame C is a bar 54, said bar being adapted to move transversely of the bolts 23 and 24 and carrying a finger 55 engaged in the recess 47 whereby the reciprocation of said bar will oscillate the disk 46 as will be obvious. The bar 54 has one end reduced as at 56 so as to form shoulders 57. Encircling the reduced portion 56 and bearing against the frame C and the shoulders 57 is a spring 58 which constantly tends to hold the bar 54 at the limit of its movement in one direction. Rotatably mounted in the frame C and extending through the member 15 is an operating shaft 59 having a collar 60 fixed thereon provided with substantially opposite wings 61 and 62. The end of the collar 60 adjacent the member 15 is provided with a lug 63 adapted to detachably engage in a recess 64 formed in a bearing 65 on the frame C and in which bearing the shaft 59 rotates. The shaft 59 is capable of limited longitudinal movement and is encircled by a spring 66 which constantly urges the shaft and the collar 60 in the direction of the bearing 65. The shaft 59 has fixed on the end thereof remote from the frame C an operating handle 67 whereby same may be conveniently rotated or moved longitudinally against the influence of the spring 66 as desired. The bar 54 has the end thereof adjacent the shaft 59 recessed to form a shoulder 68 against which the wing 61 is adapted to engage when the shaft 59 is rotated in one direction and whereby the bar 54 is moved longitudinally and the disk 46 rotated. When the bar 54 is moved longitudinally against the influence of the spring 58 by the rotation of the shaft 59 the rotation of the disk 46 will draw the pawls 34 and 39 out of engagement with respective ratchet wheels 30 and the lug 63 will aline with and be forced into the recess 64 by the spring 66 so that depression of the plungers 44 will be ineffective to operate the mechanisms for retracting the bolts 23 and 24.

Also slidably mounted in the frame C for movement parallel to the bar 54 is a latch 69 provided with a recess 70 forming a bill 71 adapted to be normally disposed across the opening 19. The latch 69 is normally held in position to dispose the bill 71 across the opening 19 by means of a spring 72. The end of the latch 69 adjacent the shaft 59 is recessed to form a shoulder 73 against which the wing 62 is adapted to engage when the shaft 59 is rotated in one direction, such rotation of the shaft 59 serving to move the latch 69 against the influence of the spring 72 and the bill 71 out of the limits of the opening 19. The edge of the latch 69 adjacent the disk 46 is recessed as at 74 and yieldingly mounted in the frame C is a block 75 provided with a groove 76 in which the latch 69 slides. The block 75 is constantly held in engagement with the edge of the latch 69 adjacent the disk 46 by means of a spring 77. When the latch 69 is moved so as to shift the bill 71 out of the limits of the opening 19 the block 75 will automatically pass into the recess 74 and lock the latch against movement under the influence of the spring 72. The keeper 20 in addition to being provided with an opening 21 to receive the bill 71 has a forked free end forming arms 78 and 79. When the latch 69 is locked retracted by the block 75 and the keeper 20 is moved into the opening 19 by swinging the door B it will be obvious that the arms 78 and 79 will be disposed on opposite sides of the latch 69 and engage the block 75 so that the movement of said keeper will in turn move the block 75 against the influence of the spring 77. When the opening 21 alines with the bill 71 the block 75 shall have been forced entirely out of the recess 74 and the spring 72 will then operate to move the latch 69 longitudinally and engage the bill 71 through the opening 21. Mounted in the frame C are cylinders 80 and 81 and arranged in these cylinders and operating through the member 15 are spring plungers 82 and 83 respectively which normally project a slight distance beyond the outer side of the member 15 and are forced inwardly by the closing of the door B. Through the medium of these plungers an initial opening movement is imparted to the door B when same is released.

Assuming the door B to be locked in order to effect the opening thereof it is first necessary to move the shaft 59 longitudinally against the influence of the spring 66 so as to disengage the lug 63 from the recess 64 and the wing 61 from engagement with the shoulder 68. The spring 58 will then move the bar 54 toward the shaft 59 and rotate the disk 46 with the result that the pawls 34 and 39 will be moved into engagement with the respective ratchet wheels 30. The plungers 34 are then operated to retract the bolts 23 and 24 from the keepers 18. The shaft 59 is then rotated to move the latch 69 and disengage the bill 71 from the opening 21 when the plungers 82 and 83 will operate to impart an initial opening movement to the door B. When the door B is closed the latch 69 will be operated to engage the bill 71 through the opening 21 as previously described. The shaft 59 is then rotated to engage the wing 61 against the shoulder 68 and thus move the bar 54 against the influence of the spring 58. This movement of the bar 54 will rotate the disk 46 to withdraw the pawls 34 and 39 from engagement with respective ratchet wheels 30. The springs 27 and 28 will then automatically operate to project the bolts 23 and 24 through the keepers 18 as will be obvious.

What is claimed is:—

A lock comprising a casing, a locking bolt slidably mounted therein, spring means constantly tending to hold said bolt in projected or locking position, a ratchet wheel mounted in the casing, a lever pivoted in the casing, a pawl pivoted to said lever and coöperating with said ratchet wheel, means for rocking the lever to rotate the ratchet wheel, a locking pawl pivoted in the casing and coöperating with the ratchet wheel, means for disconnecting both of said pawls from the ratchet wheel when the bolt is in projected position, means for rocking the lever to rotate the ratchet wheel, and connections between the ratchet wheel and the bolt whereby the rotation of said wheel under the influence of the rocking of said lever will retract the bolt.

In testimony whereof, I affix my signature, in the presence of two witnesses.

ERNEST PALLADINI.

Witnesses:
JOHN W. MICHEL,
C. BERARDINELLI.

Copies of this patent may be obtained for five cents each, by addressing the "Commissioner of Patents Washington, D. C."